US011615118B2

(12) United States Patent
Cruanes et al.

(10) Patent No.: US 11,615,118 B2
(45) Date of Patent: *Mar. 28, 2023

(54) MULTI-CLUSTER WAREHOUSE

(71) Applicant: Snowflake Inc., San Mateo, CA (US)

(72) Inventors: Thierry Cruanes, San Mateo, CA (US); Benoit Dageville, Foster City, CA (US); Florian Andreas Funke, San Francisco, CA (US); Peter Povinec, Redwood City, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/862,140

(22) Filed: Apr. 29, 2020

(65) Prior Publication Data

US 2020/0257705 A1    Aug. 13, 2020

Related U.S. Application Data

(63) Continuation of application No. 15/582,071, filed on Apr. 28, 2017.

(Continued)

(51) Int. Cl.
*G06F 16/28* (2019.01)
*H04L 67/1097* (2022.01)
(Continued)

(52) U.S. Cl.
CPC .......... *G06F 16/283* (2019.01); *G06F 9/5072* (2013.01); *G06F 16/2455* (2019.01);
(Continued)

(58) Field of Classification Search
CPC . G06F 16/2455; G06F 16/283; H04L 41/0896
See application file for complete search history.

(56) References Cited

U.S. PATENT DOCUMENTS 8,296,419 B1    10/2012    Khanna et al.
2006/0136354 A1*  6/2006    Bell .................... G06F 16/2471
(Continued)

FOREIGN PATENT DOCUMENTS

CN    104813292    7/2015

OTHER PUBLICATIONS

PCT International Search Report for counterpart PCT Application No. PCT/US2017/030207, 2 pgs. (dated Jul. 7, 2017).
(Continued)

*Primary Examiner* — Hosain T Alam
*Assistant Examiner* — Anthony G Gemignani
(74) *Attorney, Agent, or Firm* — Womble Bond Dickinson (US) LLP

(57) ABSTRACT

A method for a multi-cluster warehouse includes allocating processing units as part of a data warehouse. The processing units access data within one or more databases in cloud storage resources. The method also includes providing one or more queries to each processing unit within the data warehouse. In response to the queries, each processing unit performs database operations on a particular portion of a database table. The method also includes monitoring a workload of the processing units to determine that a processing capacity of the processing units has reached a threshold processing capacity. The method also includes dynamically adding additional processing units to and removing processing units from the data warehouse as needed based on a workload of the processing units.

30 Claims, 8 Drawing Sheets

Related U.S. Application Data

(60) Provisional application No. 62/328,943, filed on Apr. 28, 2016.

(51) Int. Cl.
*G06F 16/2455* (2019.01)
*H04L 41/0896* (2022.01)
*H04L 67/1008* (2022.01)
*H04L 41/5025* (2022.01)
*G06F 9/50* (2006.01)
*H04L 43/0817* (2022.01)

(52) U.S. Cl.
CPC ...... *H04L 41/0896* (2013.01); *H04L 41/5025* (2013.01); *H04L 67/1008* (2013.01); *H04L 67/1097* (2013.01); *H04L 43/0817* (2013.01)

(56) References Cited

U.S. PATENT DOCUMENTS

| | | | |
|---|---|---|---|
| 2007/0156733 A1 | 7/2007 | Meyerson | |
| 2011/0125894 A1 | 5/2011 | Anderson et al. | |
| 2011/0126197 A1 | 5/2011 | Larsen et al. | |
| 2012/0102189 A1* | 4/2012 | Burge | G06F 9/5083 709/224 |
| 2013/0205028 A1* | 8/2013 | Crockett | G06F 9/5027 709/226 |
| 2014/0149590 A1* | 5/2014 | Mallipeddi | G06F 9/5088 709/226 |
| 2014/0214799 A1* | 7/2014 | Li | G06F 16/24532 707/718 |
| 2015/0135185 A1* | 5/2015 | Sirota | G06F 9/5011 718/103 |
| 2015/0149442 A1* | 5/2015 | Kim | G06F 16/24545 707/719 |
| 2015/0234682 A1 | 8/2015 | Dageville et al. | |
| 2015/0235308 A1* | 8/2015 | Mick | G06F 9/45558 705/26.3 |
| 2015/0379076 A1* | 12/2015 | Grosse | G06F 16/2448 707/718 |

OTHER PUBLICATIONS

PCT Written Opinion of the International Searching Authority for counterpart PCT Application No. PCT/US2017/030207, 17 pgs. (dated Jul. 7, 2017).

PCT International Preliminary Report on Patentability for PCT Application No. PCT/US2017/030207, 18 pgs. (dated Oct. 30, 2018).

Dageville "Snowflake Challenge: Concurrent Load and Query" Sep. 22, 2015 (Sep. 22, 2015) retrieved from <https://www.snowflake.com/blog/snowflake-challenge-concurrent-load-and-query/>.

First Examination Report for counterpart Australian Patent Application No. 2017258659, 3 pgs. (dated May 17, 2019).

Second Examination Report for counterpart Australian Patent Application No. 2017258659, 4 pgs. (dated Jan. 22, 2020).

Extended European Search Report for European Patent Application No. 17790579.1, 13 pgs. (dated Aug. 30, 2019).

Benoit Dageville, et al., "The Snowflake Elastic Data Warehouse," Proceedings of the 2016 International Conference on Management of Data, SIGMOD '16, XP055416980, pp. 215-226 (Jan. 1, 2016).

Notification of First Office Action trom the China National Intellectual Property Administration (CNIPA) for Chinese Patent Application No. 2017800260068, dated Apr. 26, 2021, pp. 14.

\* cited by examiner

MULTI-CLUSTER WAREHOUSE

PRIORITY

This application is a continuation of U.S. application Ser. No. 15/582,071, filed Apr. 28, 2017, which claims the benefit under 35 U.S.C. § 119(e) of U.S. Provisional Application No. 62/328,943, filed Apr. 28, 2016, entitled "Multi-Cluster Warehouses", which is hereby incorporated by reference herein in its entirety.

TECHNICAL FIELD

The present disclosure relates to systems, methods, and devices for a multi-cluster warehouse.

BACKGROUND

Databases are widely used for data storage and access in computing applications. Databases may include one or more tables that include or reference data that can be read, modified, or deleted using queries. Databases can store small or extremely large sets of data within one or more tables. This data can be accessed by various users in an organization or even be used to service public users, such as via a website or an application program interface (API). Both computing and storage resources, as well as their underlying architecture, can play a large role in achieving desirable database performance.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF PREFERRED EMBODIMENTS

Figure 1:
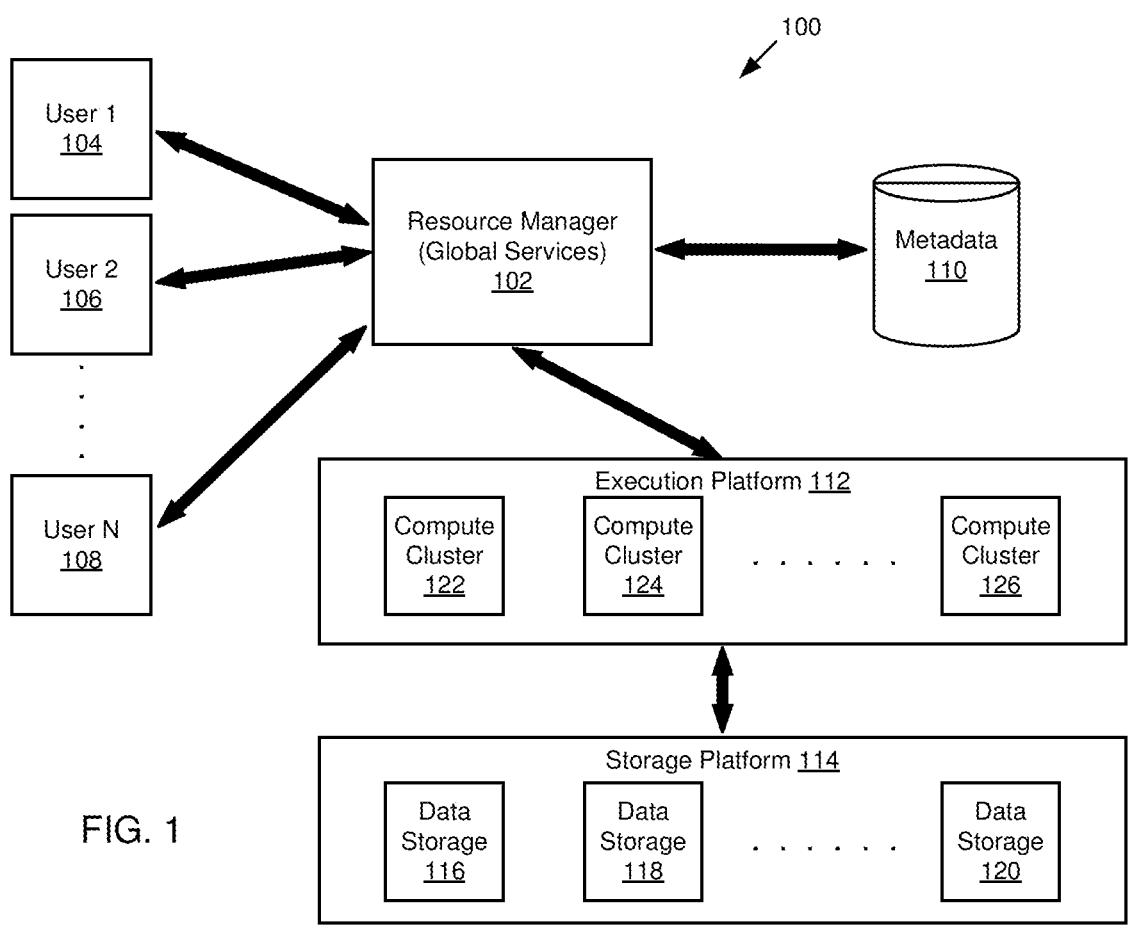
FIG. 1 is a block diagram depicting a processing platform according to an example embodiment of the systems and methods described herein.

The present disclosure is directed to system, methods, and devices for providing and managing multi-cluster warehouses. A warehouse is several servers that are connected and collaborate in handling analytical queries. In some warehouses, compute and storage resources are connected and allocated together. In at least some embodiments disclosed herein, compute resources are independently allocated and scalable separate from storage resources. In some cases, a warehouse includes one or more clusters and/or a cluster of one or more server nodes that can work together to provide services. Applicants have developed, and herein present, architectures, methods, algorithms, and systems for multi-cluster warehouses.

According to one embodiment, a method for a multi-cluster warehouse includes allocating a plurality of compute clusters as part of a virtual warehouse. The compute clusters may be used to access and perform queries against one or more databases in one or more cloud storage resources. The method includes providing queries for the virtual warehouse to each of the plurality of compute clusters. For example, each of the plurality of compute clusters of the virtual warehouse may receive a plurality of queries so that the computing load is spread across the different clusters. The method may also include dynamically adding compute clusters to and removing compute clusters from the virtual warehouse as needed based on a workload of the plurality of compute clusters.

A multi-cluster warehouse can provide significant improvements in concurrency as well as availability. For example, a warehouse generally includes only one single cluster whose size is the size of the warehouse. For example, a large warehouse may include a single cluster of eight server nodes. A multi-cluster warehouse may allow for creation of a single warehouse with multiple clusters. Each cluster within the warehouse may include eight server nodes. Thus, the multi-cluster warehouse may support three times the level of concurrency provided by a single cluster warehouse of the same size. This architecture can allow for a high level of concurrency against a single warehouse while also allowing for scaling of computing resources, as will be discussed further herein.

Improved availability can also be achieved in a multi-cluster warehouse by placing different clusters in different availability zones. For example, multi-cluster warehouses will provide improved fault resilience since each warehouse cluster could be allocated in a different availability zone of a cloud provider (such as within different Amazon® availability zones. Hence, a multi-cluster warehouse would be highly available compare to a single-cluster warehouse. Furthermore, queries can be routed to an optimal cluster where relevant data segments are already in memory or local disk-based storage (e.g., in a cache). For example, a method for a multi-cluster warehouse may include routing queries based on a session from which the query originated. By providing queries from a same session to a same cluster, a likelihood is increased that the data needed for a query is already in memory and may eliminate a need to retrieve that data from a cloud storage resource. With improved concurrency and availability, users may experience improved response times and availability that would be difficult or impossible to achieve in other traditional single-cluster database architectures.

In addition to improved availability and concurrency, significant variation in automatic scaling of compute resources is possible. For example, at least some embodiments provide separate allocation of compute resources from cloud storage. Thus, a multi-cluster warehouse can be scaled up or down in the number of compute clusters to accommodate wide swings in workload while still querying against the data that has not changed or is changing very slowly compared to the query workload.

Automatically resuming or starting a new or suspended cluster may be performed when the warehouse cannot handle the workload and would have to queue queries (or queue queries longer than an accepted length of time). Queries can get queued because the total resource consumption on the cluster has exceeded a threshold. For example, the resource consumption may include parameters for memory load as well as computing or processing load. In one embodiment, a parameter controls for how long a query may be queued before a new cluster should be resumed or provisioned. As soon as the new cluster has resumed, queries can be scheduled to execute on the new cluster. This applies to new queries as well as already queued queries.

In one embodiment, a method for a multi-cluster warehouse may include dynamically adding compute clusters to the virtual warehouse based on the workload. The method may include determining whether a query can be processed while meeting a performance metric for the query. If the query in combination with a current workload does not allow one or more currently allocated compute clusters to meet the performance metric, the method may include triggering startup of a new compute cluster. In some embodiments, a new cluster can be allocated quickly enough to ensure that not a single query experiences less than the required performance metric.

Auto-suspending or decommissioning an active cluster of a multi-cluster warehouse may be performed when the resource consumption of the workload is low enough that suspending that cluster would not have caused any query executed in the past N minutes to be queued (or queued longer than a threshold time). The queueing of a query or a queuing time for a query is just one example of a performance metric that may be used. In one embodiment, a method for a multi-cluster warehouse may include removing compute clusters based on the workload. The method may include determining whether a current workload is serviceable by one fewer than the plurality of compute clusters while meeting a performance metric. The method may include decommissioning (or suspending) at least one compute cluster of the plurality of compute clusters in response to determining that the workload is serviceable by one fewer than the plurality of compute clusters.

According to one embodiment, automatic provisioning or removal of clusters, as well as routing queries to different clusters within a warehouse, may be used as part of a powerful and flexible multi-cluster warehouse as a service.

A detailed description of systems and methods consistent with embodiments of the present disclosure is provided below. While several embodiments are described, it should be understood that this disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments may be practiced without some or all of these details. Moreover, for the purpose of clarity, certain technical material that is known in the related art has not been described in detail in order to avoid unnecessarily obscuring the disclosure.

Turning to the figures, FIG. 1 is a block diagram illustrating a processing platform 100 for providing and/or managing a multi-cluster warehouse, according to one embodiment. The processing platform 100 includes a resource manager 102 that is accessible by multiple users 104, 106, and 108. The resource manager 102 may also be referred to herein as a database service manager. In some implementations, resource manager 102 can support any number of users desiring access to data or services of the processing platform 100. Users 104-108 may include, for example, end users providing data storage and retrieval queries and requests, system administrators managing the systems and methods described herein, software applications that interact with a database, and other components/devices that interact with resource manager 102.

The resource manager 102 may provide various services and functions that support the operation of the systems and components within the processing platform 100. Resource manager 102 has access to stored metadata 110 associated with the data stored throughout data processing platform 100. The resource manager 102 may use the metadata 110 for optimizing user queries. In some embodiments, metadata 110 includes a summary of data stored in remote data storage systems as well as data available from a local cache (e.g., a cache within one or more of the clusters of the execution platform 112). Additionally, metadata 110 may include information regarding how data is organized in the remote data storage systems and the local caches. Metadata 110 allows systems and services to determine whether a piece of data needs to be processed without loading or accessing the actual data from a storage device.

As part of the data processing platform 100, metadata 110 may be collected when changes are made to the data using a data manipulation language (DML), which changes may be made by way of any DML statement. Examples of manipulating data may include, but are not limited to, selecting, updating, changing, merging, and inserting data into tables. As part of the processing platform 100, files may be created and the metadata 110 may be collected on a per file and a per column basis, after which the metadata 110 may be saved in a metadata store. This collection of metadata 110 may be performed during data ingestion or the collection of metadata 110 may be performed as a separate process after the data is ingested or loaded. In an implementation, the metadata 110 may include a number of distinct values; a number of null values; and a minimum value and a maximum value for each file. In an implementation, the metadata may further include string length information and ranges of characters in strings.

Resource manager 102 is further in communication with an execution platform 112, which provides multiple computing resources that execute various data storage and data retrieval operations, as discussed in greater detail below. The execution platform 112 may include one or more compute clusters which may be dynamically allocated or suspended for specific warehouses, based on the query workload provided by the users 104-108 to a specific warehouse. The execution platform 112 is in communication with one or more data storage devices 116, 118, and 120 that are part of a storage platform 114. Although three data storage devices 116, 118, and 120 are shown in FIG. 1, the execution platform 112 is capable of communicating with any number of data storage devices. In some embodiments, data storage devices 116, 118, and 120 are cloud-based storage devices located in one or more geographic locations. For example, data storage devices 116, 118, and 120 may be part of a public cloud infrastructure or a private cloud infrastructure, or any other manner of distributed storage system. Data storage devices 116, 118, and 120 may include hard disk drives (HDDs), solid state drives (SSDs), storage clusters, or any other data storage technology. Additionally, the storage platform 114 may include a distributed file systems (such as Hadoop Distributed File Systems (RDFS)), object storage systems, and the like.

In some embodiments, the communication links between resource manager 102 and users 104-108, metadata 110, and execution platform 112 are implemented via one or more data communication networks and may be assigned various tasks such that user requests can be optimized. Similarly, the communication links between execution platform 112 and data storage devices 116-120 in storage platform 114 are implemented via one or more data communication networks. These data communication networks may utilize any communication protocol and any type of communication medium. In some embodiments, the data communication networks are a combination of two or more data communication networks (or sub-networks) coupled to one another. In alternate embodiments, these communication links are implemented using any type of communication medium and any communication protocol.

As shown in FIG. 1, data storage devices 116, 118, and 120 are decoupled from the computing resources associated with execution platform 112. This architecture supports dynamic changes to the data processing platform 100 based on the changing data storage/retrieval needs, computing needs, as well as the changing needs of the users and systems accessing data processing platform 100. The support of dynamic changes allows data processing platform 100 to scale quickly in response to changing demands on the systems and components within data processing platform 100. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources.

The resource manager 102, metadata 110, execution platform 112, and storage platform 114 are shown in FIG. 1 as individual components. However, each of resource manager 102, metadata 110, execution platform 112, and storage platform 114 may be implemented as a distributed system (e.g., distributed across multiple systems/platforms at multiple geographic locations) or may be combined into one or more systems. Additionally, each of the resource manager 102, storage for metadata 110, the execution platform 112, and the storage platform 114 can be scaled up or down (independently of one another) depending on changes to the requests received from users 104-108 and the changing needs of the data processing platform 100. Thus, in the described embodiments, the data processing platform 100 is dynamic and supports regular changes to meet the current data processing needs.

The execution platform 112 includes a plurality of compute clusters 122, 124, 126 which may share a compute or processing load of the processing platform 100. In one embodiment, customers can control the number of active (i.e. running) clusters by specifying a range (e.g., specifying values such as minClusterCount and maxClusterCount) when creating a warehouse or changing its configuration (both while the warehouse is running and while it is suspended). Customers may specify an exact number of active clusters by specifying, for example, making the minimum cluster count equal to the maximum cluster count so that the warehouse will have that exact number running whenever it is running. If a user specifies a maximum cluster count that is greater than a minimum cluster count, the resource manager 102 may automatically manage the number of currently active clusters based on the workload to satisfy the throughput criteria and to be cost-effective. So, whenever the warehouse is running, at least a minimum cluster count (minClusterCount) of clusters are active, and at most a maximum cluster count (maxClusterCount) of clusters are active. The resource manager 102 may decide how many clusters are required to handle the current workload given the specified performance criteria in terms of memory load and concurrency level.

Figure 2:
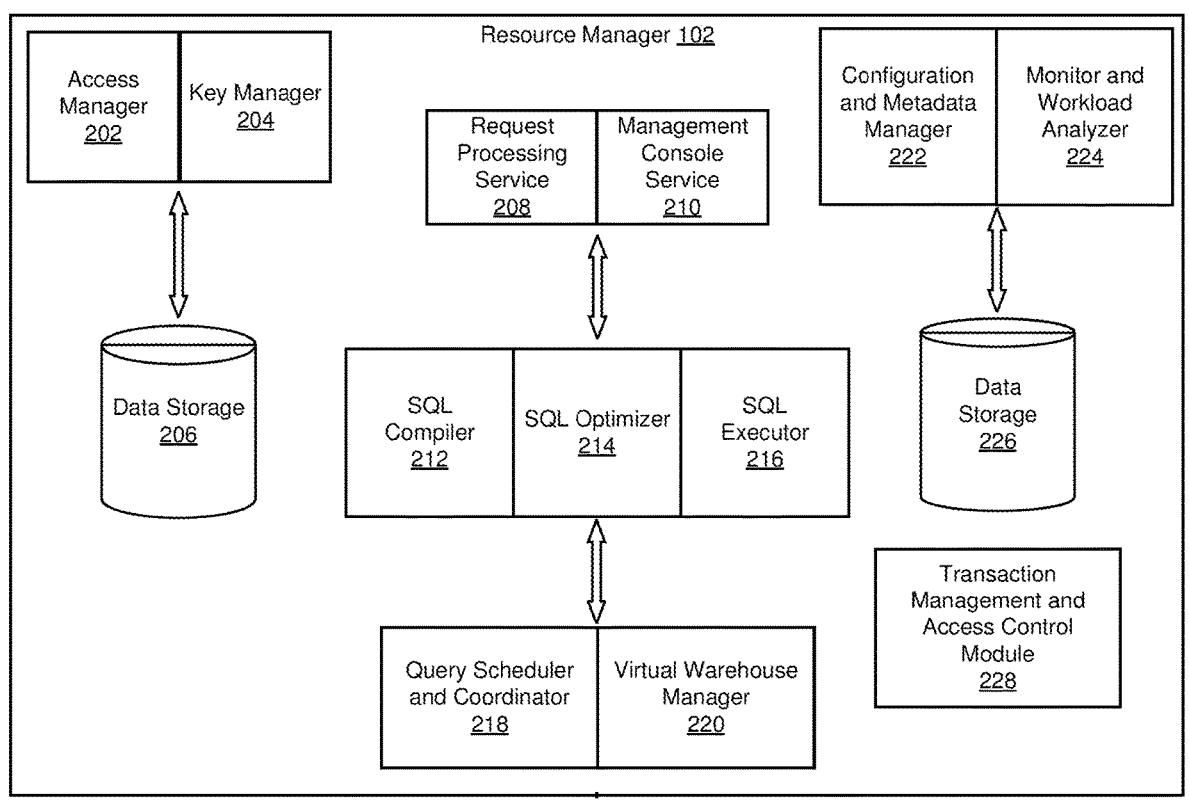
FIG. 2 is a block diagram illustrating components of a resource manager, according to one embodiment.

FIG. 2 illustrates a block diagram depicting components of resource manager 102, according to one embodiment. The resource manager 102 includes an access manager 202 and a key manager 204 coupled to a data storage device 206. The access manager 202 handles authentication and authorization tasks for the systems described herein. The key manager 204 manages storage and authentication of keys used during authentication and authorization tasks. A request processing service 208 manages received data storage requests and data retrieval requests. A management console service 210 supports access to various systems and processes by administrators and other system managers.

The resource manager 102 also includes an SQL compiler 212, an SQL optimizer 214 and an SQL executor 216. SQL compiler 212 parses SQL queries and generates the execution code for the queries. SQL optimizer 214 determines the best method to execute queries based on the data that needs to be processed. SQL executor 216 executes the query code for queries received by resource manager 102. A query scheduler and coordinator 218 sends received queries to the appropriate services or systems for compilation, optimization, and dispatch to an execution platform 112. A virtual warehouse manager 220 manages the operation of multiple virtual warehouses, including multi-cluster warehouses, implemented in execution platform 112.

Additionally, the resource manager 102 includes a configuration and metadata manager 222, which manages the information related to the data stored in the remote data storage devices and in the local caches. A monitor and workload analyzer 224 oversees the processes performed by the resource manager 102 and manages the distribution of tasks (e.g., workload) across the virtual warehouses and execution nodes in the execution platform 112. Configuration and metadata manager 222 and monitor and workload analyzer 224 are coupled to a data storage device 226.

The resource manager 102 also includes a transaction management and access control module 228, which manages the various tasks and other activities associated with the processing of data storage requests and data access requests. For example, the transaction management and access control module 228 provides consistent and synchronized access to data by multiple users or systems. Since multiple users/systems may access the same data simultaneously, changes to the data must be synchronized to ensure that each user/system is working with the current version of the data. Transaction management and access control module 228 provides control of various data processing activities at a single, centralized location in resource manager 102.

With further reference to the virtual warehouse manager 220, automatic cluster resume and automatic cluster suspend in a multi-cluster warehouse will be discussed. In one embodiment, the virtual warehouse manager 220 will perform automatic cluster resume. When a multi-cluster warehouse (e.g., within the execution platform 112) is marked for automatic resume, the first cluster for the warehouse will be automatically resumed when a SQL statement is scheduled and all clusters in the warehouse are in a suspended state. But the decision to automatically resume the remaining clusters will be performed based on the workload. This assumes that activeClusterCount<maxClusterCount, that is, we have clusters that may be activated/resumed, but are currently suspended.

Workload considerations include at least two things. First, workload considerations may account for memory usage. When queries are scheduled and are queued because all clusters are at their maximum memory capacity, the virtual warehouse manager 220 will resume one or more clusters so that queueing can be avoided, or shortened. Queuing may still occur if new clusters need to be resumed since resuming a cluster may take a bit of time, for example in minutes. However, the virtual warehouse manager 220 may also make sure that there is a free pool of several free servers so that queries can be put on the free pool during the starting of the new cluster. Also, the virtual warehouse manager 220 may wait a specific period of time to see if queuing will resolve by itself before deciding to provision a new cluster.

Second, workload considerations may account for a degree of concurrency, or the processing/computing load on a cluster. If the degree of concurrency is high on all active clusters, then the virtual warehouse manager 220 may start another cluster even if there is enough memory to schedule the query. Here, the degree of concurrency may be computed for each active cluster based on the degree of parallelism (DOP). Specifically, the degree of concurrency may be the number of queries miming at full DOP. For example, this may be calculated as the sum the DOP for all running queries divided by the product of a max DOP (MAX_DOP) and the number of running queries. This can be fractional or non-integer value since some lightweight queries are running with a smaller DOP than the max. In one embodiment, a warehouse parameter may be specified to control the degree of concurrency. For example, the degree of concurrency (concurrency_level_target_may be set to the value of 8 by default. This parameter may be exposed to a customer since its value really depends on how much money the customer wants to put on that problem and how much they are willing to allow query performance to degrade when a warehouse is shared (compared to the stand-alone query performance).

In one embodiment, the virtual warehouse manager 220 will perform automatic cluster suspend. In one embodiment, the full warehouse may shut down after a specific number of seconds (e.g., based on an auto suspend parameter) of inactivity. Orthogonally to this, when the warehouse has more than one active cluster, one or more clusters may be suspended if the warehouse was miming below its capacity for more than a specified amount of time, e.g. measured in minutes. For example, consider a warehouse with three active clusters. If for more than a specified time period the warehouse is under-loaded, i.e. would have been able to execute all SQL statements issued in the specified time period engine at the current time without any queueing or without going over the maximum degree of concurrency, then one or more clusters would be suspended. Note that while a warehouse is underloaded, it will still leverage all clusters currently active. A cluster does not need to be inactive for a specific number of minutes to be shut down. A check for automatic cluster suspend may be performed on a periodic basis, such as for the last 5 minutes, last 10 minutes, last half hour, last hour, etc. In one embodiment, the check for automatic cluster may be performed at an interval different than the specified time period. For example, the check whether the last 10 minutes have been below load may be performed upon each hour change so that a customer can be charged on an hourly basis.

With further reference to the query scheduler and coordinator 218, query scheduling may be performed based on workload, query affinity, and other factors. The query scheduler and coordinator 218 and may forward queries to a specific cluster based on workload. For example, the query scheduler and coordinator 218 may attempt to maintain an approximately equal workload on each cluster to spread out processing tasks and to improve query execution time and user experience. Query affinity may be used so that related queries, especially queries related to the same data, will be sent to the same cluster. For example, the query scheduler and coordinator 218 may send queries having a same session identifier to the same cluster. Forwarding queries based on query affinity may allow the query scheduler and coordinator 218 to ensure that the data against which a query is to be performed is already in the local cache of a specific cluster. This can significantly reduce response time, workload, and data lookup.

Figure 3:
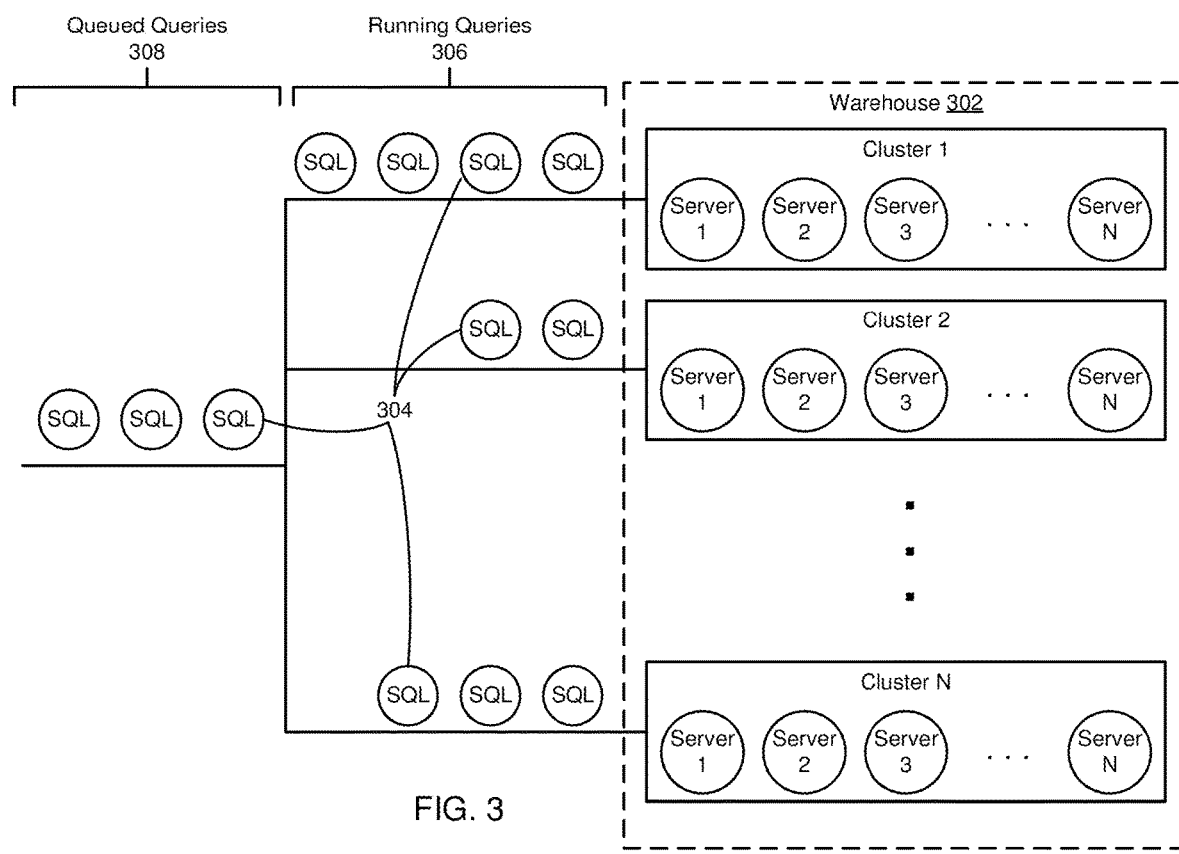
FIG. 3 is a block diagram depicting scheduling on a multi-cluster warehouse, according to one embodiment.

FIG. 3 is a schematic block diagram illustrating a multi-cluster warehouse 302 and the scheduling of queries 304 on the multi-cluster warehouse 302. The warehouse 302 includes a plurality of clusters (Cluster 1, Cluster 2, Cluster N) that each include a plurality of server nodes. In one embodiment, each of the clusters includes the same number of servers although this may be different in different embodiments. In one embodiment, each server in a cluster belong to the same availability zone but different clusters may be placed in different availability zones. The concept of availability of the warehouse may be based on overall availability percentage of the warehouse. For example, the availability for a specific cluster within the warehouse 302 may be the percentage of servers which are available (e.g., in an operational state) relatively to the cluster size. However, when that percentage goes below the minimum (e.g., 50%) required to run a query 0% availability may be determined for that cluster and no queries may be assigned until the warehouse 302, or some of the servers in the warehouse 302, is repaired. As discussed herein, the number of clusters in the warehouse 302 may be adjusted dynamically based on workload, server failures in the clusters, or the like.

In one embodiment, the query scheduler and coordinator 218 weights each query (e.g., SQL statement or portion of a SQL statement) based on its projected resource consumption. For example, some queries may take significantly more memory to perform while other queries may take significantly more processing resources to perform. Similarly, some queries may have high or low consumption for both memory and processing. The resource manager 102 may determine what the predicted or projected consumption is and then may be able to determine where to place the query to most efficiently balance the workload among different clusters. For example, on high consumption query may use as many resources as multiple low consumption queries.

In one embodiment, the query scheduler and coordinator 218 may schedule queries on the one or more clusters of the warehouse 302 or may queue queries when workload is too high or availability is too low. For example, the query scheduler and coordinator 218 may first attempt to schedule a query 304 (e.g. a SQL statement) on an active (i.e. not suspended) cluster of the warehouse 302. If there are multiple active clusters, the query scheduler and coordinator 218 will eliminate the set of clusters which are not available or where the query 304 would not run because memory would be over-subscribed. As mentioned previously, a cluster may be determined not available by default if less than 50% of the servers of a node are not available (e.g., have failed). If there are multiple possible clusters remaining, the query scheduler and coordinator 218 may then pick the least loaded cluster. The least loaded cluster, in one embodiment, is defined as the sum of the DOPs of all jobs running on that cluster. The least loaded cluster may also be based on the sum of all memory requirements for that cluster. If there are multiple clusters with equal load, the query scheduler and coordinator 218 may use the session ID for the specific query 304 as a tie-breaker such that queries from the same session can execute on the same cluster. Queries 304 that have been assigned to a cluster in the warehouse 302 are shown as running queries 306.

If there are not any clusters to schedule a specific query, then the query scheduler and coordinator 218 may queue the query in a global queue. Globally queued queries 304 are shown as queued queries 308. Queued queries 308 may remain queued until one of the cluster of the warehouse 302 is freed up or becomes available. Note that one or more servers in an assigned cluster might be marked as suspected failed in which case some running queries 306 may also have to be queued waiting for the cluster to be repaired.

Figure 4:
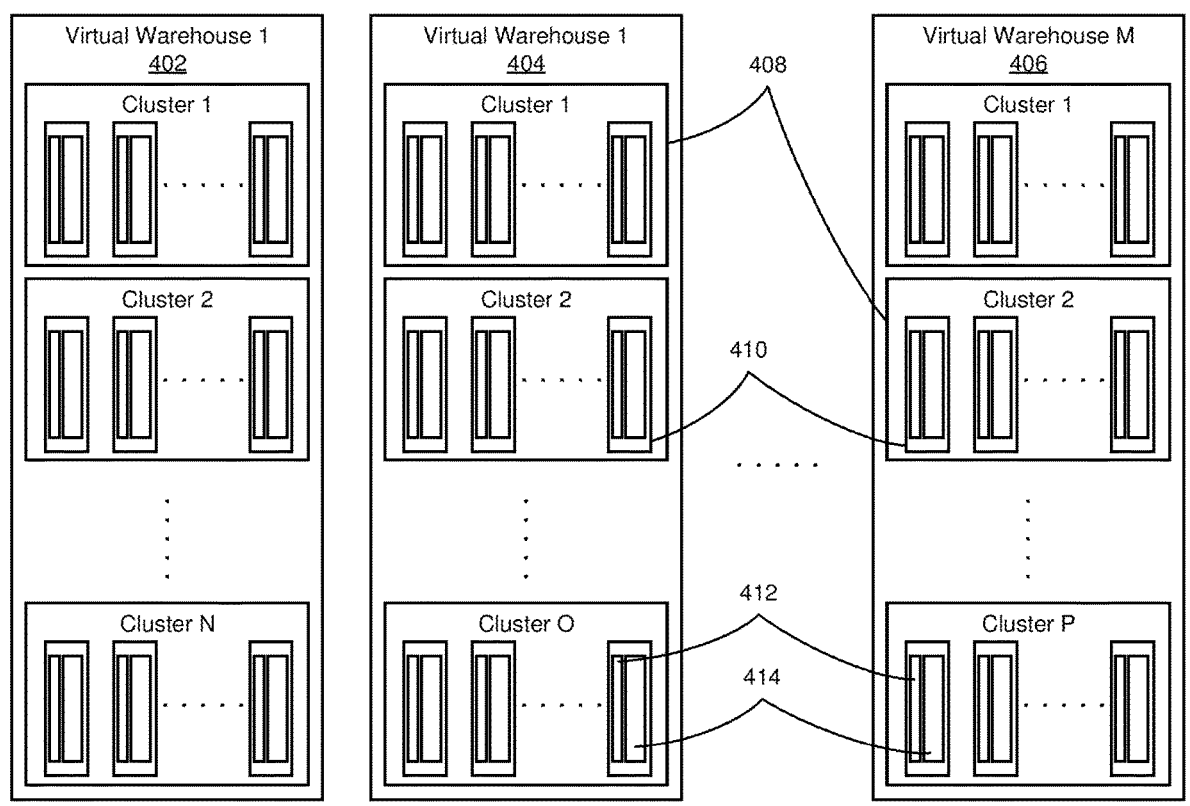
FIG. 4 is a block diagram depicting a plurality of warehouses which may be provided on a single execution platform, according to one embodiment.

FIG. 4 is a block diagram depicting an embodiment of a plurality of warehouses which may be active or operating on a single execution platform 112, according to one embodiment. Multiple virtual warehouses 402, 404, 406 are shown and each virtual warehouse includes a plurality of clusters 408. Each cluster 408 includes multiple execution nodes 410 that each include a processor 412 and a cache 414 (e.g. memory). Although three virtual warehouses 402-406 are shown, the number of virtual warehouses may change dynamically. Similarly, the number of clusters 408 in each warehouse 402-406, and the number of execution nodes 410 in each cluster may vary in different embodiments and may also vary relative to each other without limitation. Furthermore, the number of clusters 408 in a virtual warehouse and a number of execution nodes 410 in a cluster may be dynamic, such that new clusters 408 and execution nodes 410 are created or removed when demand changes.

Each virtual warehouse 402-406 is capable of accessing any of the data storage devices 116-120 shown in FIG. 1. Thus, virtual warehouses 402-406 are not necessarily assigned to a specific data storage device 116-120 and, instead, can access data from any of the data storage devices 116-120. Similarly, each of the clusters 408 and execution nodes 410 can access data from any of the data storage devices 116-120. In some embodiments, a particular virtual warehouse or a particular execution node may be temporarily assigned to a specific data storage device, but the virtual warehouse or execution node may later access data from any other data storage device.

Although the illustrated execution nodes 410 each include one cache and one processor, alternate embodiments may include execution nodes containing any number of processors and any number of caches. Additionally, the caches may vary in size among the different execution nodes 410. The caches 414 store, in the local execution node, data that was retrieved from one or more data storage devices in storage platform 114 (FIG. 1). Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes which is significantly faster and avoids the bottleneck problem discussed above. In some embodiments, the caches are implemented using high-speed memory devices that provide fast access to the cached data. Each cache can store data from any of the storage devices in storage platform 114.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, a particular execution node may be assigned more processing resources if the tasks performed by the execution node become more processor intensive. Similarly, an execution node may be assigned more cache resources if the tasks performed by the execution node require a larger cache capacity.

Although virtual warehouses 402-406 are associated with the same execution platform 112, the virtual warehouses may be implemented using multiple computing systems at multiple geographic locations. For example, virtual warehouse 402 can be implemented by a computing system at a first geographic location, while virtual warehouses 404 and 406 are implemented by another computing system at a second geographic location. In some embodiments, these different computing systems are cloud-based computing systems maintained by one or more different entities.

Additionally, each virtual warehouse is shown in FIG. 4 as having multiple clusters 408. The clusters 408 associated with each virtual warehouse may be implemented using multiple computing systems at multiple geographic locations or within different availability zones. For example, a particular instance of virtual warehouse 402 implements clusters 408 with execution nodes 410 on one computing platform at a particular geographic location, and implements other clusters 408 and execution nodes 410 at a different computing platform at another geographic location. The virtual warehouses 402-406 are also fault tolerant. For example, if one virtual warehouse or an execution node 410, that virtual warehouse or execution node is quickly replaced at the same or different geographic location.

A particular execution platform 112 may include any number of virtual warehouses 402-406. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

Figure 5:
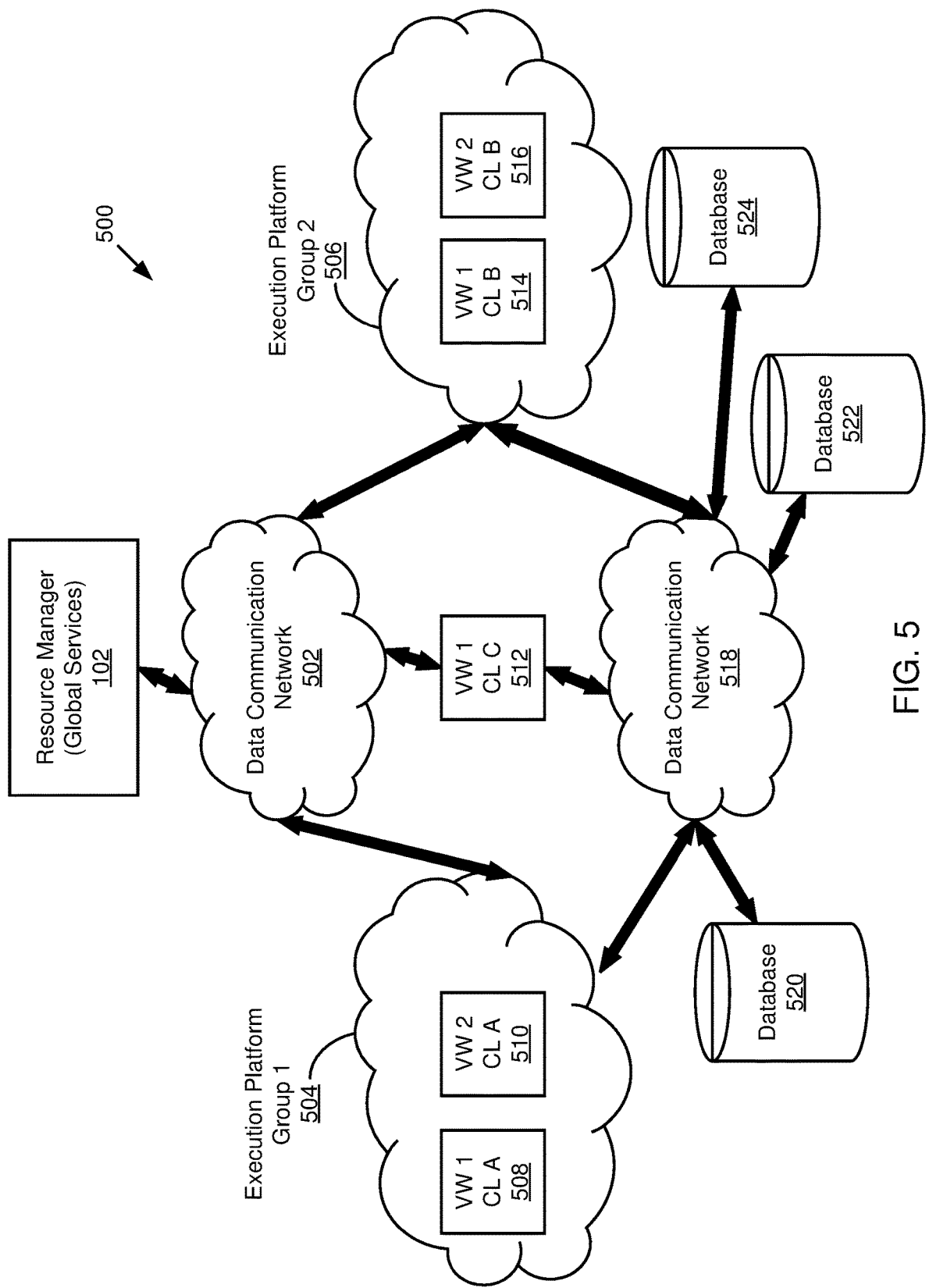
FIG. 5 is a block diagram illustrating a system having multiple distributed virtual warehouses, according to one embodiment.

FIG. 5 illustrates a block diagram depicting another example operating environment 500 having multiple distributed virtual warehouses and execution platform groups. Environment 500 includes resource manager 102 that communicates with execution platform group 1 504 and execution platform group 2 506 through a data communication network 502. Execution platform group 1 504 includes two clusters, specifically, cluster A for a first virtual warehouse 508 and cluster A for a second virtual warehouse 510. Execution platform group 2 506 includes two additional clusters, specifically, cluster B for the first virtual warehouse 514 and cluster B for the second virtual warehouse 516. The resource manager 102 also communicates with cluster C of the first virtual warehouse 512 (which is not part of either of the execution platform groups 504, 506) through data communication network 502.

Execution platform groups 504 and 506 as well as cluster C for the first virtual warehouse 512 communicate with databases 520, 522, and 524 through a data communication network 518. In some embodiments data communication networks 502 and 518 are the same network or a combination of one or more overlapping networks. Environment 500 allows resource manager 102 to coordinate user data storage and retrieval requests across multiple clusters 508-516 of multiple warehouses to store and retrieve data in databases 520-524. Execution platform groups 504 and 506, as well as cluster C for the first virtual warehouse 512, can be located in the same or different geographic area, or can be located in the same or different availability zones. Additionally, execution platform groups 504 and 506 can be implemented by the same entity or by different entities.

The systems and methods described herein allow data to be stored and accessed as a service that is separate from computing (or processing) resources. Even if no computing resources have been requested from the execution platform, data is available to a virtual warehouse without requiring reloading of the data from a remote data source. The described systems and methods are useful with any type of data. In particular embodiments, data is stored in a structured, optimized format. The decoupling of the data storage/access service from the computing services also simplifies the sharing of data among different users and groups. As discussed herein, each virtual warehouse can access any data to which it has access permissions, even at the same time as other virtual warehouses are accessing the same data. This architecture supports running queries without any actual data stored in the local cache. The systems and methods described herein are capable of transparent dynamic data movement, which moves data from a remote storage device to a local cache, as needed, in a manner that is transparent to the user of the system. Further, this architecture supports data sharing without prior data movement since any virtual warehouse can access any data due to the decoupling of the data storage service from the computing service.

Furthermore, the environment 500 allows for the spreading of a single virtual warehouse across multiple geographic locations or availability zones. For example, clusters 508, 512 and 514 all belong to the same virtual warehouse (the first virtual warehouse) but may be located in different geographic areas or availability zones. Because outages or failures may happen across a geographic area or availability zone, improved fault tolerance may be achieved. For example, availability zones are sometimes implemented by cloud service (compute or storage) providers so that problems in one availability zone have little or no chance of propagating to a different availability zone. Thus, clusters within the same warehouse but in different availability zones can significantly decrease the likelihood that a warehouse is left without any available execution or compute nodes.

In one embodiment, the multi-cluster warehouse embodiments disclosed herein may use a special data definition language (DDL). The following are some examples of commands or instructions which may be part of a multi-cluster warehouse DDL:
create warehouse single_cluster size=xlarge;
// this will create a single cluster warehouse
create warehouse multi_cluster size=xlarge max_cluster_count=3
min_cluster_count=1;
// this will create an x-large 3 cluster warehouse. Only one cluster will be started by default
create warehouse multi_cluster size=xlarge max_cluster_count=3
min_cluster_count=2;
// this will create an x-large warehouse with 2 clusters initially resumed
create warehouse multi_cluster size=xlarge max_cluster_count=3
min_cluster_count=3;
// this will create an x-large warehouse with all clusters resumed
Note that the resource manager would try to make use of all availability zones, one per cluster. The availability zone to use for each cluster may be implemented by an infrastructure management system
alter warehouse <warehouse_name> set warehouse_size=<size>: allows one to change the size of the warehouse. If this warehouse is started, all clusters in the warehouse will be resized. The code to implement this instruction may include a resize operation for each cluster.
alter warehouse <warehouse_name> set max_cluster_count=<count>: this will add or remove clusters from an existing warehouse. Internally clusters may be numbered so this operation will either add new clusters at the end of the range or remove clusters starting from the end of the range. If new clusters are created, they will be created in a suspended state. If clusters are removed and these clusters are active, they will first be inactivated (quiesced) to allow running queries to terminate.
drop warehouse <warehouse_name>: drop warehouse and all associated clusters. Clusters will be inactivated (quiesced) before dropping them.

Figure 6:
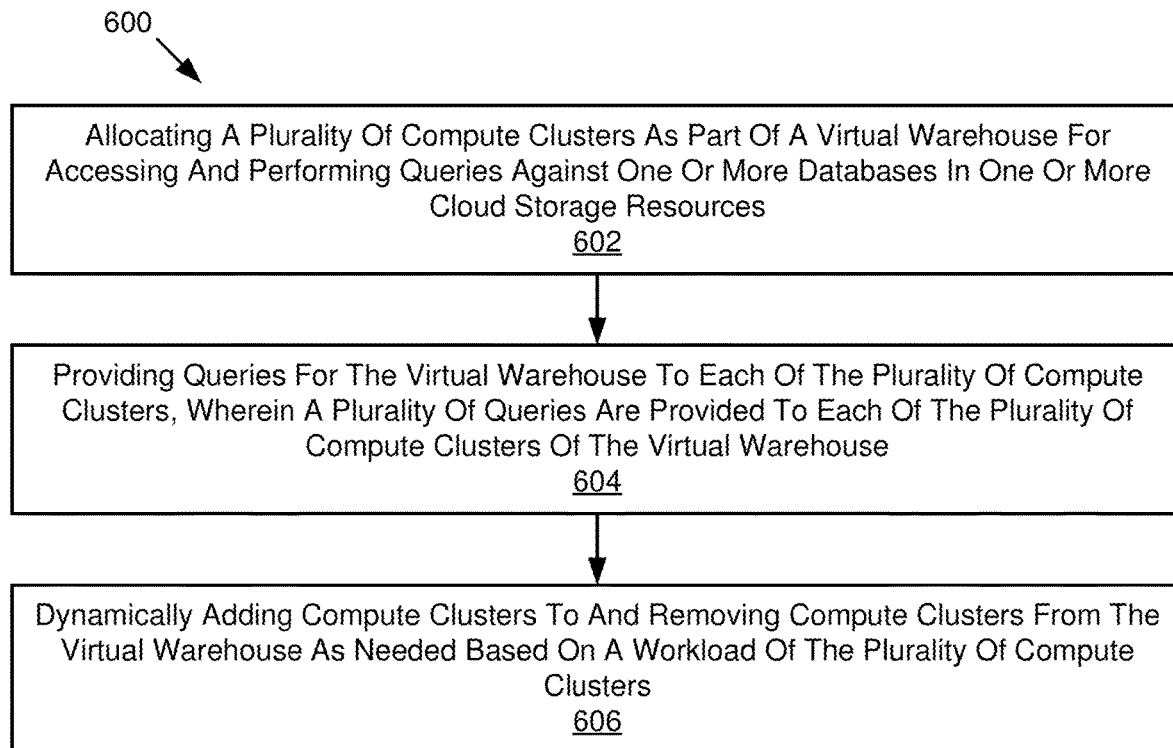
FIG. 6 is a schematic flow chart diagram illustrating a method for a multi-cluster warehouse, according to one embodiment.

Returning to the figures, FIG. 6 is a schematic flow chart diagram illustrating an example method 600 for a multi-cluster warehouse. The method 600 may be performed by a processing platform or a resource manager, such as the processing platform 100 of FIG. 1 or the resource manager of FIG. 1, 2, or 5.

The method 600 begins and a system allocates 602 a plurality of compute clusters as part of a virtual warehouse for accessing and performing queries against one or more databases in one or more cloud storage resources. In one embodiment, the plurality of compute clusters is allocated by the system independently from the one or more cloud storage resources such that the number of compute clusters can be scaled up and down without increasing or decreasing the one or more cloud storage resources. The system provides 604 queries for the virtual warehouse to each of the plurality of compute clusters. For example, the plurality of queries may be provided to each of the plurality of compute clusters of the virtual warehouse. The system dynamically adds 606 compute clusters to and removes compute clusters from the virtual warehouse as needed based on a workload of the plurality of compute clusters. The method 600 may also include determining the workload for the plurality of compute clusters. The system may determine the workload by determining an availability of one or more of processor resources for each of the plurality of compute clusters and memory resources for each of the plurality of compute clusters.

Method 600 may be implemented by a database system or device to allow a single entity, such as a warehouse, to expand and shrink depending on a number of queries.

Figure 7:
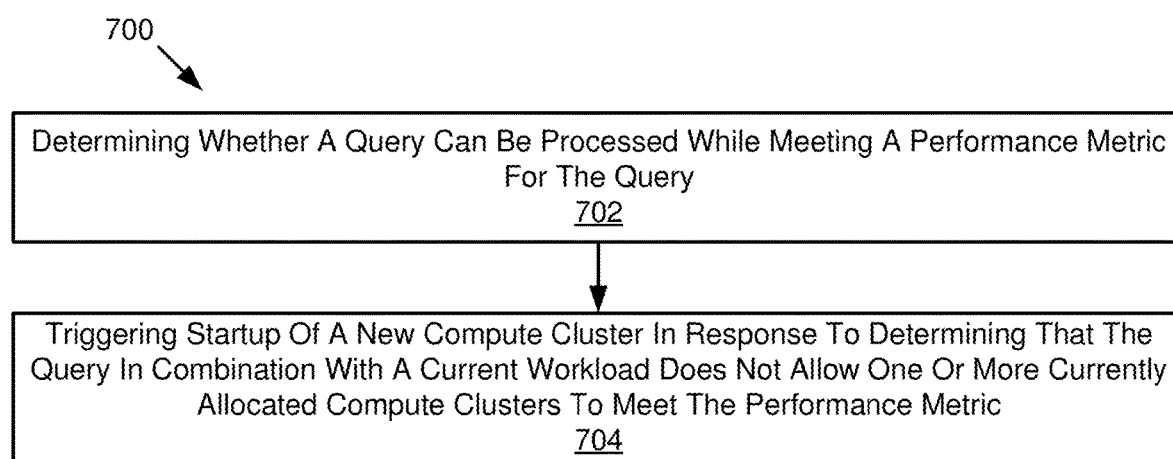
FIG. 7 is a schematic flow chart diagram illustrating a method for dynamically adding compute clusters in a multi-cluster warehouse, according to one embodiment.

Specifically, as changes in the concurrency (or compute and memory load) of a warehouse occur, a resource manager or other system may allow the warehouse to scale up and down FIG. 7 is a schematic flow chart diagram illustrating an example method 700 for dynamically adding compute clusters in a multi-cluster warehouse. The method 700 may be performed by a processing platform or a resource manager, such as the processing platform 100 of FIG. 1 or the resource manager of FIG. 1, 2, or 5. The method 700 may be performed in conjunction with or separately from method 600 of FIG. 6.

The method 700 begins and a system determines 702 whether a query can be processed while meeting a performance metric for the query. In one embodiment, the method 700 includes determining 702 whether the query can be processed for each query directed to the compute cluster such that the performance metric is met for each query. The performance metric may include a service level agreement (SLA) accepted by a customer. For example, the SLA may require that a query be scheduled within a specific amount of time (e.g., 10 seconds). This may restrict any query from being queued in a global queue longer than a maximum time (e.g., 10 seconds). The SLA may be agreed to in advance between a warehouse as a service provider and a customer. Different price tiers may be presented based on what the SLA is, or the SLA may dictate that the system uses more resources to ensure that users experience minimum delay in accessing and performing queries against a database.

Figure 8:
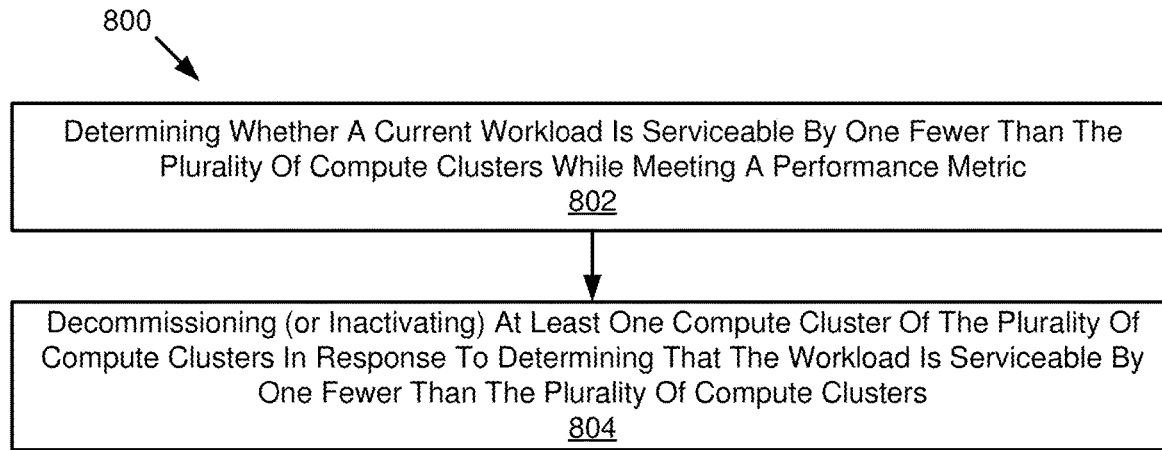
FIG. 8 is a schematic flow chart diagram illustrating a method for dynamically removing compute clusters in a multi-cluster warehouse, according to one embodiment.

The system triggers 704 startup of a new compute cluster in response to determining that the query in combination with a current workload does not allow one or more currently allocated compute clusters to meet the performance metric. In one embodiment, the system may only trigger 704 startup if the number of currently active clusters is less than a predetermined maximum number of compute clusters FIG. 8 is a schematic flow chart diagram illustrating an example method 800 for dynamically removing compute clusters in a multi-cluster warehouse. The method 800 may be performed by a processing platform or a resource manager, such as the processing platform 100 of FIG. 1 or the resource manager of FIG. 1, 2, or 5. The method 800 may be performed in conjunction with or separately from one or more of methods 600 or 700 of FIGS. 6 and 7.

The method 800 begins and a system determines 802 whether a current workload is serviceable by one fewer than the plurality of compute clusters while meeting a performance metric. In one embodiment, determining 802 whether the current workload is serviceable by one fewer than the plurality of compute clusters may include determining whether a historical workload for a time period leading up to the current time was serviceable by one fewer than the plurality of clusters while meeting the performance metric. For example, if the best cluster were removed from the virtual warehouse, would the virtual warehouse have been able to process all the queries while meeting the performance metric?

The system decommissions 804 (or inactivating) at least one compute cluster of the plurality of compute clusters in response to determining that the workload is serviceable by one fewer than the plurality of compute clusters. The system may only decommission 804 or remove a compute cluster if the current number of active clusters is less than a predetermined minimum number of compute clusters. In one embodiment, decommissioning 804 the at least one compute cluster may include decommissioning in response to determining that the historical workload for the time period was serviceable by one fewer than the plurality of compute clusters.

In one embodiment, decommissioning 804 the at least one compute cluster includes making a cluster quiescent to prevent providing or scheduling of additional queries to the at least one compute cluster. Decommissioning 804 may also include allowing the at least one compute cluster to complete currently assigned queries and releasing one or more resources corresponding to the at least one compute cluster upon completion of the already scheduled or active queries.

Figure 9:
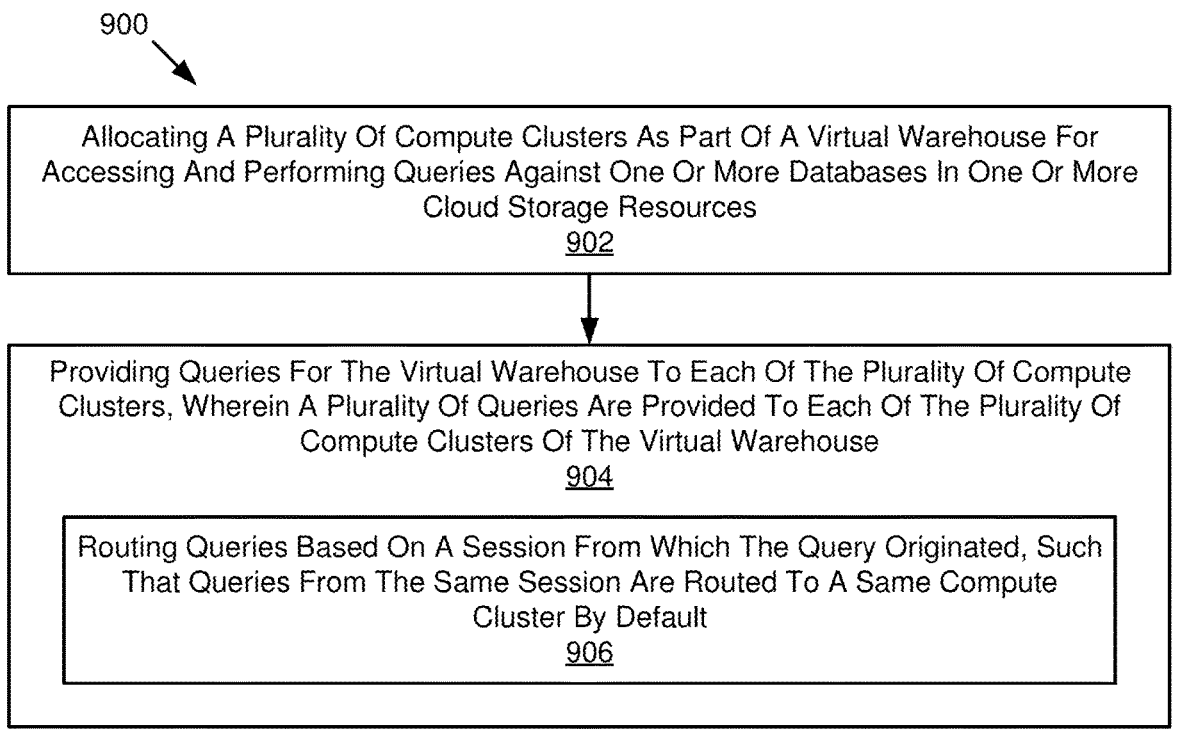
FIG. 9 is a schematic flow chart diagram illustrating a method for a multi-cluster warehouse, according to one embodiment

FIG. 9 is a schematic flow chart diagram illustrating an example method 900 for a multi-cluster warehouse. The method 900 may be performed by a processing platform or a resource manager, such as the processing platform 100 of FIG. 1 or the resource manager of FIG. 1, 2, or 5. The method 900 may be performed in conjunction with or separately from one or more of methods 600, 700, or 800 of FIGS. 6, 7, and 8.

The method 900 begins and a system allocates 902 a plurality of compute clusters as part of a virtual warehouse for accessing and performing queries against one or more databases in one or more cloud storage resources. The system forwards 904 queries for the virtual warehouse to each of the plurality of compute clusters. The plurality of queries may be provided to each of the plurality of compute clusters of the virtual warehouse. In one embodiment, forwarding 904 queries for the virtual warehouse to each of the plurality of compute clusters includes routing 906 queries based on a session from which the query originated, such that queries from the same session are routed to a same compute cluster by default. Each cluster has the ability to persist fragments of the database it is operating on. That is, each cluster (or each compute node in the cluster) may maintain a cache of all the tables that it has currently accessed while processing queries on a cluster. Thus, the resource manager or scheduler drives the queries from the same query stream (e.g., having the same session identifier) to the same cluster so they can leverage the caching effect. In some cases, if a cluster that is handling a specific session has much less available resources than another cluster, queries with the same session identifier may end up on different clusters.

In one embodiment, the system may route 906 the queries based on a workload of each of the plurality of compute clusters. For example, if a cluster cannot accept new queries, the system may provide the query to a different cluster even if the different cluster has not processed queues corresponding to the same session. In one embodiment, the system may provide 904 queries to at least two compute clusters in different availability zones.

Figure 10:
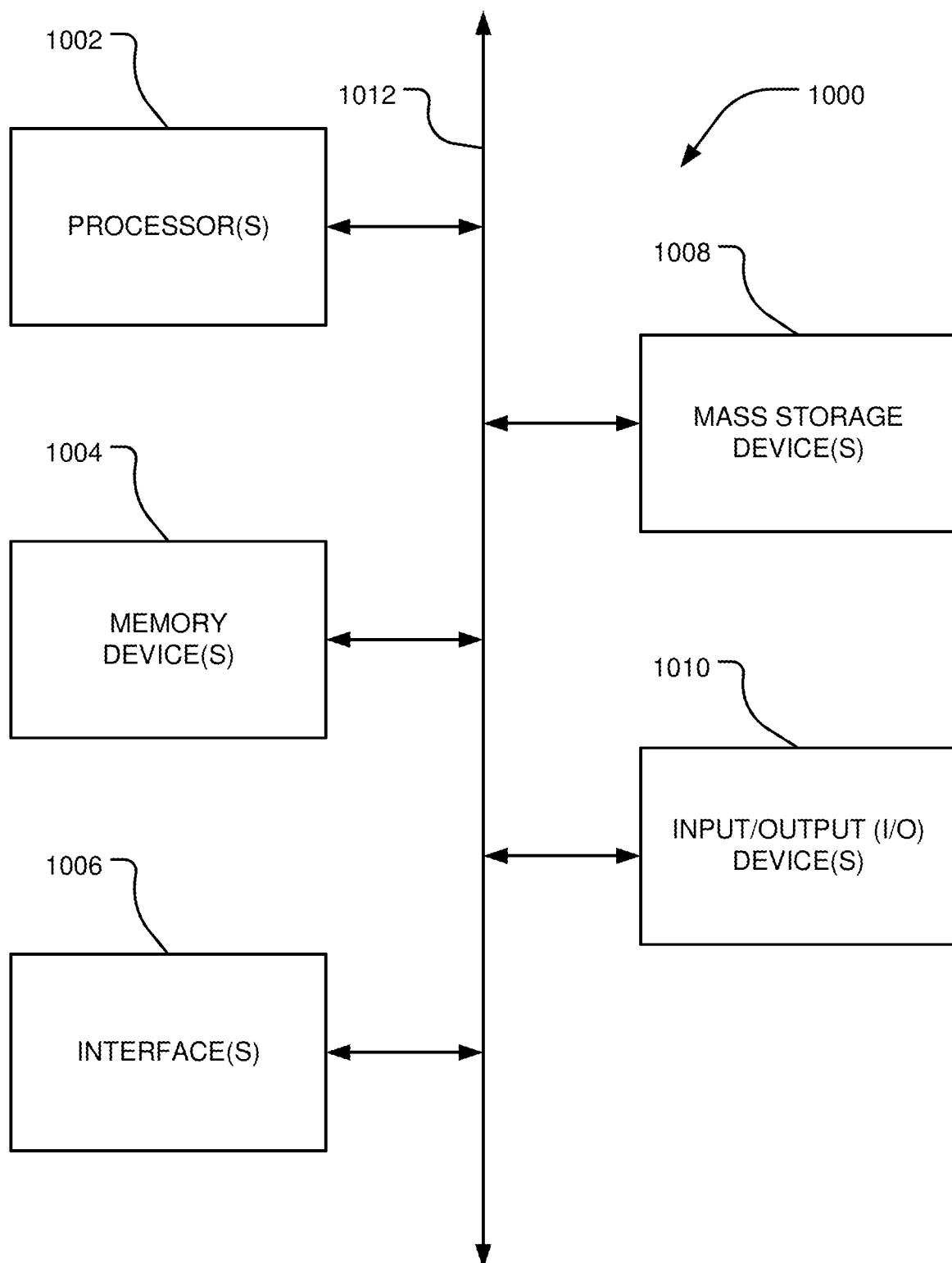
FIG. 10 is a block diagram depicting an example computing device consistent with at least one embodiment of processes and systems disclosed herein.

FIG. 10 is a block diagram depicting an example computing device 1000. In some embodiments, computing device 1000 is used to implement one or more of the systems and components discussed herein. For example, computing device 1000 may allow a user or administrator to access resource manager 102. As another example, the components, systems, or platforms discussed herein may include one or more computing devices 1000. Further, computing device 1000 may interact with any of the systems and components described herein. Accordingly, computing device 1000 may be used to perform various procedures and tasks, such as those discussed herein. Computing device 1000 can function as a server, a client or any other computing entity. Computing device 1000 can be any of a wide variety of computing devices, such as a desktop computer, a notebook computer, a server computer, a handheld computer, a tablet, and the like.

Computing device 1000 includes one or more processor(s) 1002, one or more memory device(s) 1004, one or more interface(s) 1006, one or more mass storage device(s) 1008, and one or more Input/Output (I/O) device(s) 1010, all of which are coupled to a bus 1012. Processor(s) 1002 include one or more processors or controllers that execute instructions stored in memory device(s) 1004 and/or mass storage device(s) 1008. Processor(s) 1002 may also include various types of computer-readable media, such as cache memory.

Memory device(s) 1004 include various computer-readable media, such as volatile memory (e.g., random access memory (RAM)) and/or nonvolatile memory (e.g., read-only memory (ROM)). Memory device(s) 1004 may also include rewritable ROM, such as Flash memory.

Mass storage device(s) 1008 include various computer readable media, such as magnetic tapes, magnetic disks, optical disks, solid state memory (e.g., Flash memory), and so forth. Various drives may also be included in mass storage device(s) 1008 to enable reading from and/or writing to the various computer readable media. Mass storage device(s) 1008 include removable media and/or non-removable media.

I/O device(s) 1010 include various devices that allow data and/or other information to be input to or retrieved from computing device 1000. Example I/O device(s) 1010 include cursor control devices, keyboards, keypads, microphones, monitors or other display devices, speakers, printers, network interface cards, modems, lenses, CCDs or other image capture devices, and the like.

Interface(s) 1006 include various interfaces that allow computing device 1000 to interact with other systems, devices, or computing environments. Example interface(s) 1006 include any number of different network interfaces, such as interfaces to local area networks (LANs), wide area networks (WANs), wireless networks, and the Internet.

Bus 1012 allows processor(s) 1002, memory device(s) 1004, interface(s) 1006, mass storage device(s) 1008, and I/O device(s) 1010 to communicate with one another, as well as other devices or components coupled to bus 1012. Bus 1012 represents one or more of several types of bus structures, such as a system bus, PCI bus, IEEE 1394 bus, USB bus, and so forth.

EXAMPLES

The following examples pertain to further embodiments.

Example 1 is a computer implemented method for a multi-cluster warehouse. The method includes allocating a plurality of compute clusters as part of a virtual warehouse for accessing and performing queries against one or more databases in one or more cloud storage resources. The method includes providing queries for the virtual warehouse to each of the plurality of compute clusters, wherein a plurality of queries is provided to each of the plurality of compute clusters of the virtual warehouse. The method includes dynamically adding compute clusters to and removing compute clusters from the virtual warehouse as needed based on a workload of the plurality of compute clusters.

In Example 2, the plurality of compute clusters of Example 1 is allocated independently from the one or more cloud storage resources such that the number of compute clusters can be scaled up and down without increasing or decreasing the one or more cloud storage resources.

In Example 3, the method in any of Examples 1-2 further includes determining the workload for the plurality of compute clusters. Determining the workload includes determining an availability of one or more of processor resources for each of the plurality of compute clusters memory resources for each of the plurality of compute clusters.

In Example 4, the dynamically adding compute clusters in any of Examples 1-3 includes determining whether a query can be processed while meeting a performance metric for the query and triggering startup of a new compute cluster in response to determining that the query in combination with a current workload does not allow one or more currently allocated compute clusters to meet the performance metric.

In Example 5, the method of Example 4 includes determining whether the query can be processed for each query directed to the compute cluster such that the performance metric is met for each query.

In Example 6, the performance metric in any of Examples 4-5 includes a service level agreement accepted by a customer.

In Example 7, the performance metric in any of Examples 4-6 includes a maximum time period that the query will be queued.

In Example 8, the dynamically adding compute clusters in any of Examples 1-7 includes adding compute clusters up to a predetermined maximum number of compute clusters.

In Example 9, the dynamically removing compute clusters in any of Examples 1-8 includes removing compute clusters down to a predetermined minimum number of compute clusters.

In Example 10, the removing compute clusters in any of Examples 1-9 includes determining whether a current workload is serviceable by one fewer than the plurality of compute clusters while meeting a performance metric and decommissioning at least one compute cluster of the plurality of compute clusters in response to determining that the workload is serviceable by one fewer than the plurality of compute clusters.

In Example 11, the decommissioning the at least one compute cluster in Example 10 includes: preventing providing additional queries to the at least one compute cluster; allowing the at least one compute cluster to complete currently assigned queries; and releasing one or more resources corresponding to the at least one compute cluster upon completion of the currently assigned queries.

In Example 12, the determining whether the current workload is serviceable by one fewer than the plurality of compute clusters in any of Examples 10-11 includes determining whether a historical workload for a time period leading up to the current time was serviceable by one fewer than the plurality of clusters while meeting the performance metric. Decommissioning the at least one compute cluster includes decommissioning in response to determining that the historical workload for the time period was serviceable by one fewer than the plurality of compute clusters.

In Example 13, the providing queries for the virtual warehouse to each of the plurality of compute clusters in any of Examples 1-12 includes routing queries based on a session from which the query originated.

In Example 14, the providing queries for the virtual warehouse to each of the plurality of compute clusters in any of Examples 1-13 includes routing queries based on a workload of each of the plurality of compute clusters.

In Example 15, the allocating the plurality of compute clusters in any of Examples 1-14 allocating at least two compute clusters in different availability zones Example 16 is an apparatus including means to perform a method as in any of Examples 1-15.

Example 17 is a machine-readable storage including machine-readable instructions that, when executed, implement a method or realize an apparatus of any of Examples 1-16.

The flow diagrams and block diagrams herein illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

The systems and methods described herein provide a flexible and scalable data warehouse using new data processing platforms, methods, systems, and algorithms. In some embodiments, the described systems and methods leverage a cloud infrastructure that supports cloud-based storage resources, computing resources, and the like. Example cloud-based storage resources offer significant storage capacity available on-demand at a low cost. Further, these cloud-based storage resources may be fault-tolerant and highly scalable, which can be costly to achieve in private data storage systems. Example cloud-based computing resources are available on-demand and may be priced based on actual usage levels of the resources. Typically, the cloud infrastructure is dynamically deployed, reconfigured, and decommissioned in a rapid manner.

In the described systems and methods, a data storage system utilizes an SQL (Structured Query Language)-based relational database. However, these systems and methods are applicable to any type of database using any data storage architecture and using any language to store and retrieve data within the database. The systems and methods described herein may also provide a multi-tenant system that supports isolation of computing resources and data between different customers/clients and between different users within the same customer/client.

Various techniques, or certain aspects or portions thereof, may take the form of program code (i.e., instructions) embodied in tangible media, such as floppy diskettes, CD-ROMs, hard drives, a non-transitory computer readable storage medium, or any other machine readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive.

Those having skill in the art will appreciate that many changes may be made to the details of the above-described embodiments without departing from the underlying principles of the disclosure. The scope of the present disclosure should, therefore, be determined only by the following claims.

What is claimed is:

1. A method for implementing a fault-tolerant data warehouse using availability zones, comprising:
    allocating a plurality of compute groups each comprising a plurality of compute resources as part of a data warehouse, wherein each of the compute groups accesses data using a plurality of queries with one or more databases in one or more cloud storage resources, wherein each of the compute groups includes a plurality of processing resources;
    routing, by a processing device, one or more of the plurality of queries to each of the plurality of compute groups, the plurality of compute groups comprising at least two processing units in different availability zones, an availability zone comprising one or more data centers, each data center comprising redundant power, networking, and connectivity, the one or more of the plurality of queries having a common session identifier with a query previously provided to the compute group, the compute group further determined to be caching a data segment usable by the one or more of the plurality of queries, wherein in response to the one or more of the plurality of queries, each of the plurality of compute groups performs a database operation on a particular portion of a database table; and
    changing a total number of the plurality of compute groups using at least a comparison of a targeted degree of parallelism and a runtime computed degree of parallelism of the runtime computed degree of parallelism is computed using a number of queries running at an input degree of parallelism and a change is at least one of creating a new compute group or deleting an existing compute group.

2. The method of claim 1, wherein deleting the existing compute group comprises removing the compute group down to a predetermined minimum number of compute groups.

3. The method of claim 1, wherein deleting the existing compute group comprises:
    determining whether a current workload is serviceable by fewer compute groups than the plurality of compute groups while meeting a performance metric; and
    decommissioning at least one compute group of the plurality of compute groups in response to determining that the current workload is serviceable by fewer than the plurality of compute groups.

4. The method of claim 1, wherein deleting the existing compute group comprises:
    determining whether a current workload is serviceable by at least one fewer than the plurality of compute groups based on at least a period of inactivity; and
    decommissioning at least one compute group of the plurality of compute groups.

5. The method of claim 1, wherein the plurality of compute groups is allocated within a specific geographic area selected by a user.

6. The method of claim 1, wherein the plurality of compute groups is allocated within a plurality of specific geographic region selected by a user.

7. The method of claim 1, wherein creating the new compute group comprises:
    adding the new compute group up to a predetermined maximum number of compute groups.

8. The method of claim 1, wherein routing the one or more of the plurality of queries for the data warehouse to each of the plurality of compute groups comprises routing the one or more of the plurality of queries based on a workload of each of the plurality of compute groups.

9. The method of claim 1, wherein each of the plurality of compute groups includes a local storage.

10. The method of claim 1, further comprising:
    dynamically managing storage resources associated with the plurality of compute groups.

11. The method of claim 1, wherein the targeted degree of parallelism is input by a customer.

12. A non-transitory computer-readable medium for implementing a fault-tolerant data warehouse using availability zones, storing instructions which, when executed by one or more processors of a computing device, cause the one or more processors to:
    allocate a plurality of compute groups each comprising a plurality of compute resources as part of a data warehouse, wherein each of the compute groups accesses data using a plurality of queries with one or more databases in one or more cloud storage resources, wherein each of the compute groups includes a plurality of processing resources;
    route, by a processing device, one or more of the plurality of queries to each of the plurality of compute groups, the plurality of compute groups comprising at least two processing units in different availability zones, an availability zone comprising one or more data centers, each data center comprising redundant power, networking, and connectivity, the one or more of the plurality of queries having a common session identifier with a query previously provided to the compute group, the compute group further determined to be caching a data segment usable by the one or more of the plurality of queries, wherein in response to the one or more of the plurality of queries, each of the plurality of compute groups performs a database operation on a particular portion of a database table; and
    change a total number of the plurality of compute groups using at least a comparison of a targeted degree of parallelism and a runtime computed degree of parallelism of the plurality of compute groups, wherein the runtime computed degree of parallelism is computed using a number of queries running at an input degree of parallelism and a change is at least one of creating a new compute group or deleting an existing compute group.

13. The non-transitory computer-readable medium of claim 12, wherein the deleting the compute group comprises removing the compute group down to a predetermined minimum number of compute groups.

14. The non-transitory computer-readable medium of claim 12, wherein the instructions of deleting the existing compute group further cause the one or more processors to:
determine whether a current workload is serviceable by fewer compute groups than the plurality of compute groups while meeting a performance metric; and
decommission at least one compute group of the plurality of compute groups in response to determining that the current workload is serviceable by fewer than the plurality of compute groups.

15. The non-transitory computer-readable medium of claim 12, wherein the instructions of deleting the existing compute group further cause the one or more processors to:
determine whether a current workload is serviceable by at least one fewer than the plurality of compute groups based on at least a period of inactivity; and
decommission at least one compute group of the plurality of compute groups.

16. The non-transitory computer-readable medium of claim 12, wherein the plurality of compute groups is allocated within a specific geographic area selected by a user.

17. The non-transitory computer-readable medium of claim 12, wherein the plurality of compute groups is allocated within a plurality of specific geographic region selected by a user.

18. The non-transitory computer-readable medium of claim 12, wherein the instructions of creating the new compute group further cause the one or more processors to:
add the new compute group up to a predetermined maximum number of compute groups.

19. The non-transitory computer-readable medium of claim 12, wherein routing the one or more of the plurality of queries for the data warehouse to each of the plurality of compute groups comprises routing the one or more of the plurality of queries based on a workload of each of the plurality of compute groups.

20. The non-transitory computer-readable medium of claim 12, wherein each of the plurality of compute groups includes a local storage.

21. The non-transitory computer-readable medium of claim 12, wherein the instructions further cause the one or more processors to:
dynamically manage storage resources associated with the plurality of compute groups.

22. The non-transitory computer-readable medium of claim 12, wherein the targeted degree of parallelism is input by a customer.

23. A system for implementing a fault-tolerant data warehouse using availability zones, comprising:
a processing device programmed to:
allocate a plurality of compute groups each comprising a plurality of compute resources as part of a data warehouse, wherein each of the compute groups accesses data using a plurality of queries with one or more databases in one or more cloud storage resources, wherein each of the compute groups includes a plurality of processing resources;
route, by the processing device, one or more of the plurality of queries to each of the plurality of compute groups, the plurality of compute groups comprising at least two processing units in different availability zones, an availability zone comprising one or more data centers, each data center comprising redundant power, networking, and connectivity, the one or more of the plurality of queries having a common session identifier with a query previously provided to the compute group, the compute group further determined to be caching a data segment usable by the one or more of the plurality of queries, wherein in response to the one or more of the plurality of queries, each of the plurality of compute groups performs a database operation on a particular portion of a database table; and
change a total number of the plurality of compute groups using at least a comparison of a targeted degree of parallelism and a runtime computed degree of parallelism of the plurality of compute groups, wherein the runtime computed degree of parallelism is computed using a number of queries running at an input degree of parallelism and a change is at least one of creating a new compute group or deleting an existing compute group.

24. The system of claim 23, wherein the deleting the compute group comprises deleting the compute group down to a predetermined minimum number of compute groups.

25. The system of claim 23, wherein deleting the existing compute group causes the processing device to:
determine whether a current workload is serviceable by at least fewer compute groups than the plurality of compute groups while meeting a performance metric; and
decommission at least one compute group of the plurality of compute groups in response to determining that the current workload is serviceable by fewer than the plurality of compute groups.

26. The system of claim 23, wherein deleting the existing compute group causes the processing device to:
determine whether a current workload is serviceable by at least one fewer than the plurality of compute groups based on at least a period of inactivity; and
decommission at least one compute group of the plurality of compute groups.

27. The system of claim 23, wherein the plurality of compute groups is allocated within a specific geographic area selected by a user.

28. The system of claim 23, wherein the plurality of compute groups is allocated within a plurality of specific geographic region selected by a user.

29. A method for implementing a fault-tolerant data warehouse using availability zones, comprising:
allocating a plurality of compute groups each comprising a plurality of compute resources as part of a data warehouse, wherein each of the compute groups accesses data using a plurality of queries with one or more databases in one or more cloud storage resources, wherein each of the compute groups includes a local storage;
routing, by a processing device, one or more of the plurality of queries to each of the plurality of compute groups, the plurality of compute groups comprising at least two processing units in different availability zones, an availability zone comprising one or more data centers, each data center comprising redundant power, networking, and connectivity, the one or more of the plurality of queries having a common session identifier with a query previously provided to the compute group, the compute group further determined to be caching a data segment usable by the one or more of the plurality of queries, wherein in response to the one or more of the plurality of queries, each of the plurality of compute groups performs a database operation on a particular portion of a database table; and
changing storage resources independently of adding a compute group to one or more of the compute groups using an amount of free storage available for one or more of the compute groups and the plurality of queries, and a change is at least one of creating new persistent storage resources or deleting an existing persistent storage resource.

30. The system of claim 23, wherein the targeted degree of parallelism is input by a customer.

* * * * *